United States Patent [19]

Sugo et al.

[11] Patent Number: 5,344,560
[45] Date of Patent: Sep. 6, 1994

[54] PROCESS FOR PRODUCING FILTRATION MEMBRANES HAVING AMINO ACIDS THAT ARE CAPABLE OF ADSORBING PROTEINS

[75] Inventors: Takanobu Sugo, Gunma; Kyoichi Saito, Tokyo, both of Japan

[73] Assignee: Japan Atomic Energy Research Institute, Tokyo, Japan

[21] Appl. No.: 135,423

[22] Filed: Oct. 12, 1993

Related U.S. Application Data

[63] Continuation of Ser. No. 692,680, Apr. 29, 1991, abandoned.

[30] Foreign Application Priority Data

May 10, 1990 [JP] Japan .................... 2-120351

[51] Int. Cl.$^5$ ............................. B01D 67/00
[52] U.S. Cl. ................... 210/500.23; 210/500.35; 427/245
[58] Field of Search ............ 427/245; 210/500.23, 210/500.35, 632, 638; 521/27, 32; 502/402

[56] References Cited

U.S. PATENT DOCUMENTS

| | | | |
|---|---|---|---|
| 3,083,118 | 3/1963 | Bridgeford | 427/302 X |
| 3,723,306 | 3/1973 | Bridgeford | 210/638 |
| 4,810,567 | 3/1989 | Calcaterra et al. | 428/264 X |
| 5,059,654 | 10/1991 | Hou et al. | 210/656 X |
| 5,064,866 | 11/1991 | Toyomoto et al. | 521/32 X |

OTHER PUBLICATIONS

Gething, "Chorismate Mutase/Prephenate Dehydratase from *Escherichia coli* K12" Eur. J. Biochem. (1976) 71, pp. 317–325.

Cuatrecasas, "Protein Purification by Affinity Chromatography", J. Biol. Chem., (1970) vol. 245, pp. 3059–3065.

Cuatrecasas, "Selective Enzyme Purification by Affinity Chromatography" Pro. Natl Acad. Sci. U.S.A., (1968) vol. 61, pp. 636–643.

*Primary Examiner*—Frank Spear
*Attorney, Agent, or Firm*—Banner, Birch, McKie and Beckett

[57] ABSTRACT

There is described a process for producing a filtration membrane that is also capable of adsorbing proteins. The process comprises the steps of subjecting a porous polymeric substrate to a graft polymerization reaction with a polymerizable monomer under exposure to an ultraviolet radiation or an ionizing radiation and thereafter bringing an amino acid into contact with the resulting graft membrane for immobilization. The amino acid is contained in an amount of 0.01–1 millimole per gram of the porous polymeric substrate. The polymerizable monomer to be grafted onto the porous polymeric substrate contains an epoxy group.

13 Claims, No Drawings

PROCESS FOR PRODUCING FILTRATION MEMBRANES HAVING AMINO ACIDS THAT ARE CAPABLE OF ADSORBING PROTEINS

This application is a continuation of Ser. No. 07/692,680, filed Apr. 29, 1991, now abandoned.

BACKGROUND OF THE INVENTION

1. Field of the Invention

This invention pertaining to the field of biotechnology relates more specifically to a process for producing novel filtration membranes that are useful for the purpose of simultaneously separating and removing proteins and nonionic substances in solution.

2. Prior Art

Several types of beaded resinous affinity adsorbents are commercially available for use in the analysis or separation/purification of proteins. When beaded resinous adsorbents are packed in a column, a substantial pressure loss occurs upon passage of a feed solution because the bead diameter is adjusted to approximately 10 $\mu$m with a view to accelerating the diffusion of proteins into the resin. This is a serious drawback when affinity beads are to be used in preparative chromatography, or chromatography on an industrial scale.

As an alternative, bioaffinity membranes are being under review based on the idea that proteins can be brought more advantageously into the vicinity of affinity ligands by convention rather than by diffusion. However, even this approach is unable to solve the aforementioned problem of beaded affinity adsorbents completely since affinity ligands attached to the membrane will constrict fine pores in it, thereby reducing its water permeability. In addition, no technique has been available by which affinity ligands capable of selectively capturing a group of specified proteins can be introduced in filtration membranes formed of polyolefins and other general-purpose polymers.

SUMMARY OF THE INVENTION

Under these circumstances, the present invention has as an object providing a novel filtration membrane that is suitable for use in the separation of bioproducts and that is characterized as a porous filtration that is not only capable of removing fine nonionic particles but also capable of separating, concentrating and purifying proteins in solution by means of amino acids introduced as affinity ligands into said membrane.

According to the present invention, a porous polymeric substrate formed of a homo- or copolymer of an olefin or a halogenated olefin is subjected to a graft polymerization reaction with a polymerizable monomer containing an epoxy group under exposure to an ultraviolet or ionizing radiation and, thereafter, amino acids which are group-specific affinity ligands are fixed firmly to side chains in the resulting graft polymer. The thus produced membrane is stable both chemically and physically and is not only capable of removing fine nonionic particles but also capable of efficient adsorption and separation of proteins in solution.

DETAILED DESCRIPTION OF THE INVENTION

The porous polymeric substrate which is to be subjected to a graft polymerization reaction in the present invention is formed of a homopolymer such as polyethylene, polypropylene or polytetrafluoroethylene or a copolymer of a monomer selected from the group consisting of ethylene, propylene, tetrafluoroethylene and chlorotrifluoroethylene. The porous polymeric substrate may be in the form of a flat membrane or it may comprise hollow fibers having a large surface area per unit volume. Since the proteins to be adsorbed and separated by the membrane produced by the present invention typically have a particle size of approximately 0.01 $\mu$m, the membrane preferably has an average pore size of 0.01–10 $\mu$m.

The polymerizable monomer to be grafted onto the porous polymeric substrate in the present invention is not limited to any particular type as long as it contains an epoxy group and may be exemplified by glycidyl methacrylate, glycidyl acrylate, glycidyl metaitaconate, ethylglycidyl maleate, glycidylvinyl sulfonate, etc. Among these monomers, glycidyl methacrylate is particularly advantageous.

For graft polymerization, an ultraviolet radiation or various ionizing radiations including $\alpha$-rays, $\beta$-rays, $\gamma$-rays, accelerated electron beams and X-rays may be used. In practical application, accelerated electron beams or $\gamma$-rays are desirably used.

In accordance with the present invention, the porous polymeric substrate can be subjected to a graft polymerization reaction with the polymerizable monomer by either one of the following methods: "simultaneous irradiation" in which the porous polymeric substrate and the polymerizable monomer are exposed to an ionizing radiation or a uv radiation; and "pre-irradiation" in which the porous polymeric substrate is first exposed to an ionizing radiation or a uv radiation and then the irradiated substrate is brought into contact with the polymerizable monomer. The pre-irradiation method is preferred since unwanted side reactions are less likely to occur. The graft polymerization performed in the present invention has no potential for constricting or clogging fine pores in the polymeric substrate. As a result of graft polymerization, graft chains are formed on the inner surfaces of fine pores and in the amorphous portion of the polymeric substrate and those getting into the amorphous portion of the substrate will swell it. As a result, the fine pores will increase in diameter and will not be clogged even if graft chains are formed on the surface of the polymeric substrate.

In the present invention, the porous polymeric substrate can be brought into contact with the polymerizable monomer during graft polymerization by either one of the following two methods: "liquid-phase graft polymerization" in which the porous polymeric substrate is brought into direct contact with the polymerizable monomer which is either liquid or in solution; and "vapor-phase graft polymerization" in which the porous polymeric substrate is brought into contact with the vapor or mist of the polymerizable monomer. Either method can be adopted as appropriate for a specific object.

The amino acid to be used in the present invention is not limited to any particular type as long as it is capable of adsorbing the target protein. Examples of useful amino acids include phenylalanine, tryptophan and histidine. By bringing an aqueous solution of such amino acids into contact with a graft membrane having epoxy groups that is obtained by the graft polymerization reaction, a filtration membrane having an amino acid is obtained that is capable of not only removing nonionic substances but also adsorbing proteins. The amino acid is immobilized on the graft membrane by forming a covalent bond through reaction between an epoxy group and the amino group of an amino acid according to the following scheme:

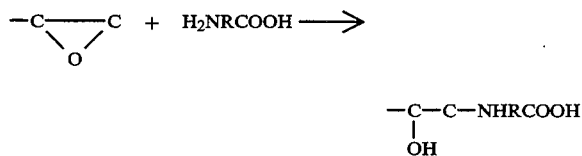

Proteins are adsorbed as a monolayer on the surface of the porous polymeric substrate. Therefore, the adsorption capacity for a protein is theoretically determined by the ratio between the surface area of the porous polymeric substrate and the area of the substrate that is occupied by the molecule of the adsorbed protein. If the amount of amino acid introduced into the porous polymeric substrate is too small, proteins will not be adsorbed at the highest possible density. On the other hand, the introduction of too much amino acid into the porous polymeric substrate will give rise to an unwanted amino acid that does not participate in the adsorption of proteins. The preferred content of amino acids that permits proteins to be adsorbed at the highest possible density ranges from 0.01 to 1 millimole per gram of the porous polymeric substrate.

The following examples are provided for the purpose of further illustrating the present invention but are in no way to be taken as limiting.

EXAMPLE 1

Porous hollow fibers (i.d. 0.62 mm; o.d. 1.24 mm; average pore size, 0.1 $\mu$m) were exposed to 200 kGy of accelerated electron beams from an electron beam accelerator (acceleration voltage, 2 MeV; electron beam current, 1 mA) in a nitrogen atmosphere. The irradiated hollow fibers were contacted by the vapor of glycidyl methacrylate at 40° C. for 6 h under vacuum to effect a vapor-phase graft polymerization reaction. The weight gain due to graft polymerization was 110%. The resulting graft membrane was submerged in a 3% aqueous solution of phenylalanine adjusted to a pH of 13 with sodium carbonate and sodium hydroxide and reaction was carried out at 80° C. for 24 h. The content of phenylalanine in the graft membrane was 0.8 millimoles per gram of the substrate. The thus produced membrane had phenylalanine as an affinity ligand and was useful not only as a filtration membrane but also as a membrane that could adsorb proteins. To examine its performance, the membrane was subjected to the following water permeation test at a pressure of 1 kg/cm$^2$ that involved affinity adsorption of proteins. When an aqueous solution of bovine serum $\gamma$-globulin (1 mg/ml) that had been adjusted to pH of 8 with a Tris-HCl buffer solution [Tris(hydroxymethyl)aminomethane/HCl buffer solution] was injected into the membrane and allowed to emerge from its outside surface, the permeation rate was found to be 1.3 m$^3$/m$^2$·h. The permeate from the outside surface of the membrane was fractionated in 5-ml portions and even in fraction 10, the permeate contained less than 0.01 mg/ml of bovine serum $\gamma$-globulin. It was therefore clear that the filtration membrane prepared in Example 1 had high ability to adsorb bovine serum $\gamma$-globulin.

EXAMPLE 2

A porous flat polyethylene membrane was used as a substrate for graft polymerization. This membrane had a thickness of 100 $\mu$m and an average pore size of 0.1 $\mu$m. Repeating the procedure of Example 1, glycidyl methacrylate was grafted onto the substrate to obtain a graft membrane with a graft efficiency of 100%. Tryptophan was immobilized as an amino acid on the graft membrane by the same method as used in Example 1. The content of tryptophan in the graft membrane was 0.5 millimoles per gram of the substrate. The thus produced membrane had tryptophan as an affinity ligand and was useful not only as a filtration membrane but also as a membrane that could adsorb proteins. To examine its performance, an aqueous solution of bovine serum $\gamma$-globulin (1 mg/ml) that had been adjusted to pH 8 with a Tris-HCl buffer solution was injected into the membrane. The permeate contained only 0.02 mg/ml of bovine serum $\gamma$-globulin after the passage of 30 min. It was therefore clear that the filtration membrane prepared in Example 2 had high ability to adsorb bovine serum $\gamma$-globulin.

EXAMPLE 3

A porous flat polypropylene membrane was used as a substrate for graft polymerization. This membrane had a thickness of 100 $\mu$m and an average pore size of 0.1 $\mu$m. Repeating the procedure of Example 1, glycidyl methacrylate was grafted onto the substrate to obtain a graft membrane with a graft efficiency of 110%. Histidine was immobilized as an amino acid on the graft membrane by the same method as used in Example 1. The content of histidine in the graft membrane was 0.4 millimoles per gram of the substrate. The thus produced membrane had histidine as an affinity ligand and was useful not only as a filtration membrane but also as a membrane that could adsorb proteins. To examine its performance, 0.1 L of an aqueous solution of bovine serum $\gamma$-globulin (1 mg/ml) was passed through the membrane. The permeate contained less than 0.02 mg/ml of bovine serum $\gamma$-globulin. It was therefore clear that the filtration membrane prepared in Example 3 had high ability to adsorb bovine serum $\gamma$-globulin.

The present invention provides a filtration membrane that also exhibits high ability to adsorb proteins in solution.

What is claimed is:

1. A process for producing a filtration membrane that is also capable of adsorbing proteins, comprising:
   subjecting a porous polymeric substrate made of a homo- or copolymer of an olefin or a halogenated olefin and a polymerizable epoxy group containing monomer to a graft polymerization reaction to form graft chains on the substrate, said graft polymerization reaction occurring upon exposure to ultraviolet or ionizing radiation, and
   immobilizing an amino acid to the graft chains by forming a covalent bond between the epoxy group of the graft chains and the amino group of the amino acid.

2. A process according to claim 1 wherein said porous polymeric substrate is in the form of either a flat membrane or an assembly of hollow fibers and has an average pore size of 0.01-10 $\mu$m.

3. A process according to claim 1 wherein the amino acid is contained in an amount of 0.01-1 millimole per gram of the porous polymeric substrate.

4. A process according to claim 1 wherein the polymerizable epoxy group-containing monomer is selected from the group consisting of glycidyl methacrylate, glycidyl acrylate, glycidyl metaitaconate, ethylglydicyl maleate and glycidyl vinyl sulfonate.

5. A process according to claim 1 wherein the amino acid is selected from the group consisting of phenylalanine, tryptophan and histidine.

6. A process according to claim 1 wherein the homopolymer or halogenated homopolymer is selected from the group consisting of polyethylene, polypropylene and polytetrafluoroethylene, and wherein the copolymer or halogenated copolymer is a copolymer of monomers selected from the group consisting of ethylene, propylene, tetrafluoroethylene and chlorotrifluoroethylene.

7. The process of claim 1 wherein the amino acid is immobilized on the graft membrane by contacting the graft membrane with an aqueous solution of amino acids.

8. A filtration membrane prepared by a process comprising:
  subjecting a porous polymeric substrate made of a homo- or copolymer of an olefin or a halogenated olefin and a polymerizable epoxy group-containing monomer to a graft polymerization reaction to form graft chains on the substrate, said graft polymerization reaction occurring upon exposure to ultraviolet or ionizing radiation, and
  immobilizing an amino acid to the graft chains by forming a covalent bond between the epoxy group of the graft chains and the amino group of the amino acid.

9. A filtration membrane according to claim 8 wherein said porous polymeric substrate is in the form of a flat membrane or an assembly of hollow fibers and has an average pore size of 0.01–10 μm.

10. A filtration membrane according to claim 8 wherein the amino acid is contained in an amount of 0.01–1 millimole per gram of the porous polymeric substrate.

11. A filtration membrane according to claim 8 wherein the polymerizable epoxy group-containing monomer is selected from the group consisting of glycidyl methacrylate, glycidyl acrylate, glycidyl metaitaconate, ethylglydicyl maleate and glycidyl vinyl sulfonate.

12. A filtration membrane according to claim 8 wherein the amino acid is selected from the group consisting of phenylalanine, tryptophan and histidine.

13. A filtration membrane according to claim 8 wherein the homopolymer or halogenated homopolymer is selected from the group consisting of polyethylene, polypropylene and polytetrafluoroethylene and wherein the copolymer or halogenated copolymer is a copolymer of monomers selected from the group consisting of ethylene, propylene, tetrafluoroethylene and chlorotrifluoroethylene.

* * * * *